United States Patent [19]
Escobedo

[11] Patent Number: 5,139,295
[45] Date of Patent: Aug. 18, 1992

[54] VEHICLE STEP

[76] Inventor: Francisco Escobedo, 23305 Ladeene Ave., Torrance, Calif. 90505

[21] Appl. No.: 774,327

[22] Filed: Oct. 10, 1991

[51] Int. Cl.$^5$ ............................................. B60R 3/00
[52] U.S. Cl. ................................. 293/117; 280/163; 182/90
[58] Field of Search .................... 293/117; 280/163; 182/90, 150, 92

[56] References Cited

U.S. PATENT DOCUMENTS

| | | | |
|---|---|---|---|
| 3,357,719 | 12/1967 | McCrea | 280/163 |
| 4,620,609 | 11/1986 | Elsten | 280/163 X |
| 4,785,910 | 11/1988 | Tonkovich | 280/163 X |
| 4,911,264 | 3/1990 | McCafferty | 280/163 X |

Primary Examiner—Robert R. Song
Attorney, Agent, or Firm—Roger A. Marrs

[57] ABSTRACT

A step is disclosed herein having downwardly depending supports from the bumper or frame of a vehicle which terminate in a flared flange for holding a step rung adapted to support the weight of a person servicing the vehicle. In one form, a pair of supports attaches at one end to the bumper or frame utilizing fasteners normally used for license plate securement. In another form, a single support includes a flare lip onto which the step rung is retained.

8 Claims, 1 Drawing Sheet

U.S. Patent
Aug. 18, 1992
5,139,295
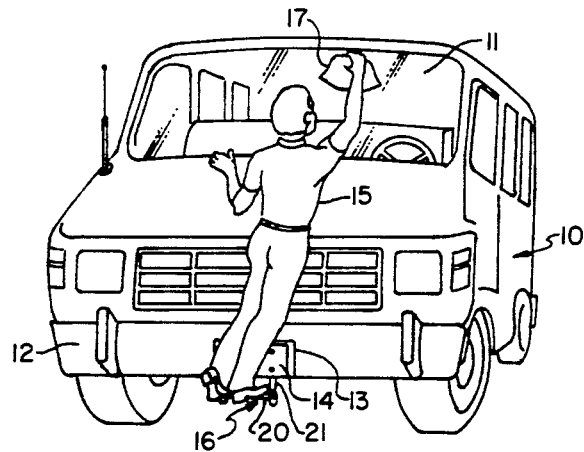
FIG. 1.
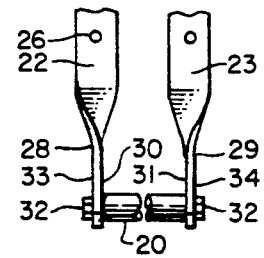
FIG. 2a.
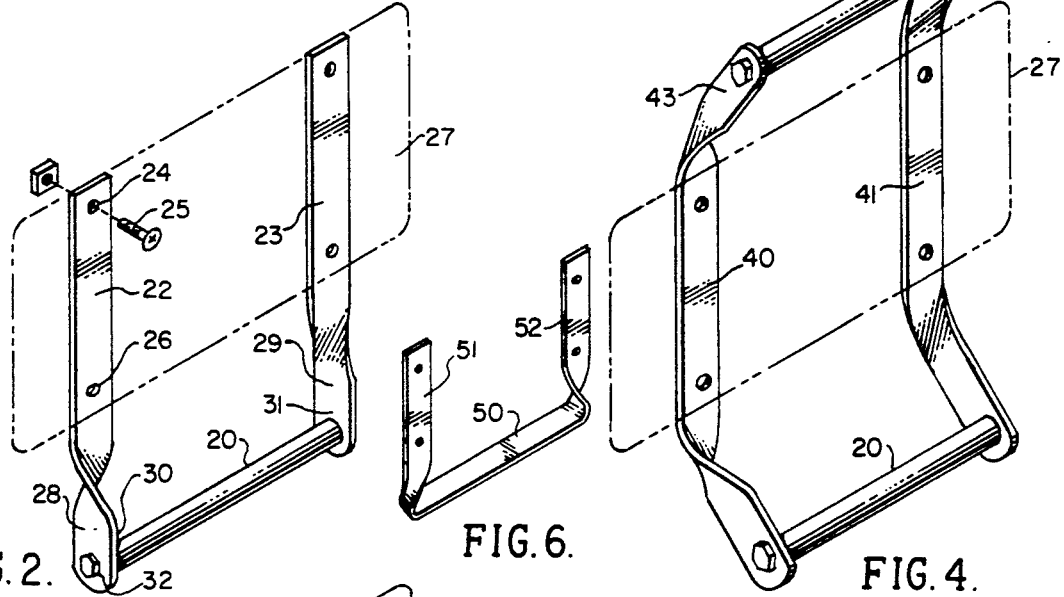
FIG. 2.
FIG. 6.
FIG. 4.
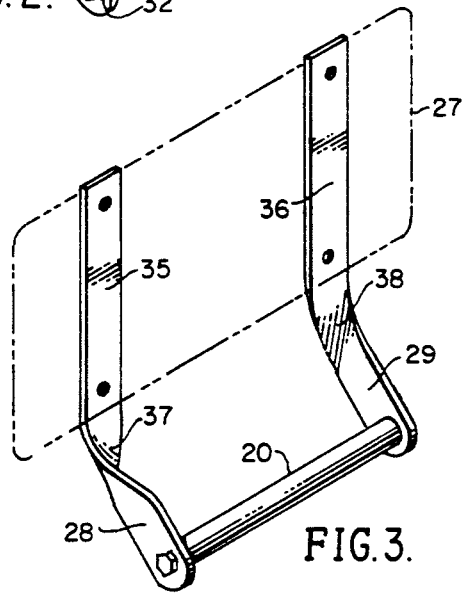
FIG. 3.
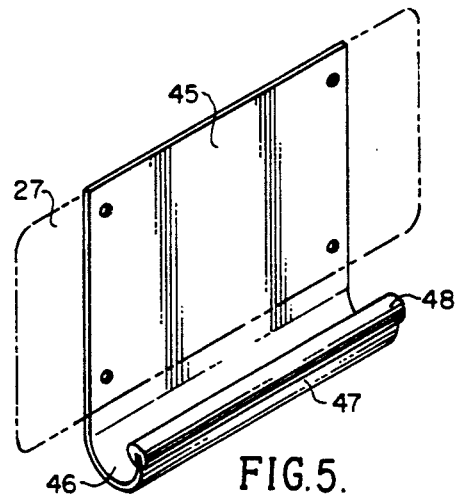
FIG. 5.

VEHICLE STEP

BACKGROUND OF THE INVENTION

1. Field of the Invention

The present invention relates to the field of automotive accessories, and more particularly, to a novel auxiliary step for vehicles which may be readily installed on the frame or bumper of the vehicle so as to support a rung upon which a person may step and support himself while servicing the vehicle.

2. Brief Description of the Prior Art

In the past, it has been the conventional practice to service vehicles such as washing and wiping the windows by standing adjacent to the vehicle and applying window cleaner with one hand while wiping with the other or by employing a squeegee for wiping the window cleaner from the window. Although this procedure has worked successfully for compact vehicles and small passenger vehicles, it is difficult to service larger vehicles, such as vans, recreational vehicles, trucks or the like. In order to wash the windows of such vehicles or otherwise service an area near the roof, the servicing personnel must employ a stool or portable steps upon which he can stand in order to reach all areas of the windshield or windows.

Obviously, such a use of stools and portable steps is hazardous since the service personnel may fall should the support on which he is standing topple or become unbalanced. Furthermore, in other instances, an extremely long-handled mop or squeegee has been used with unsuccessful results since the device is unwieldy, cumbersome and cannot be universally used on all vehicles.

Therefore, a long-standing need has existed to provide a novel arrangement for supporting service personnel while the upper portions of the vehicle are being worked upon wherein such support is rigid and preferably carried on the vehicle itself.

SUMMARY OF THE INVENTION

Accordingly, the above problems and difficulties are obviated by the present invention which provides a novel vehicle step which includes downwardly depending support means having a flared lower end upon which a step rung can be securely mounted in order to receive the foot of service personnel during a vehicle servicing procedure. In one form, the support means includes a pair of spaced-apart members having a flare at one end to which the opposite ends of the step rung may be securely attached. The opposite end of the members includes retaining means for installing the supports directly to the bumper or frame of the vehicle employing fasteners which are normally available. In another form, the support means includes an elongated plate having a bottom edge which is flared to form a lip upon which the step rung is secured and wherein the top edge marginal region of the plate includes means for receiving fasteners that are ordinarily available whereby the plate can be retained on the bumper or frame of the vehicle.

Therefore, it is among the primary objects of the present invention to provide a novel step means rigidly secured and carried on the bumper or frame of the vehicle upon which service personnel may step and receive support while performing a service procedure or function.

Another object of the present invention is to provide a novel step or support for service personnel that permits the personnel to have an extended reach so that upper portions of the vehicle, such as vans, trucks, recreational vehicles or the like can be readily serviced.

Another object of the present invention is to provide a novel step that may be attached to existing vehicles by way of license plate bolts so that the step may downwardly depend from the bumper or frame of the vehicle without obscuring or interfering with the normal function and operation of the vehicle.

Yet another object of the present invention is to provide a novel auxiliary step that may be readily installed on existing vehicles so that a secure and rigid platform or step is provided on which service personnel can stand in order to perform ordinary service procedures and functions without resorting to special servicing equipment or cumbersome tools.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective illustration of a vehicle incorporating the auxiliary step of the present invention showing service personnel performing a servicing procedure;

FIG. 2 and FIG. 2A are a front elevational view of one embodiment of auxiliary step used on the vehicle shown in FIG. 1;

FIG. 3 is a view similar to the view of FIG. 2 illustrating another version of support means for the auxiliary step;

FIG. 4 is a front perspective view similar to the views of FIGS. 2 and 3 illustrating still another embodiment of the present invention;

FIG. 5 is another embodiment of the present invention showing a plate support means; and FIG. 6 is a perspective view of an integral constructed step.

DESCRIPTION OF THE PREFERRED EMBODIMENT

Referring to FIG. 1, a vehicle is indicated by numeral 10 which is of a van or truck type and it includes a front windshield 11 which requires servicing in the form of washing and drying. The vehicle 10 also includes a bumper 12 which is provided with a recess 13 for mounting a conventional license plate 14. Servicing personnel, as indicated by numeral 15, is standing on the auxiliary step of the present invention which is represented in the general direction of arrow 16. By mounting the auxiliary step 16 at the front of the vehicle, the servicing personnel 15 may easily elevate himself so that he may readily reach the uppermost portions of windshield 11 with a cleaning cloth 17. The servicing personnel need not unduly stretch or strain and does not require a portable step or stool. The accessory step includes a step rung 20 secured to the bumper 12 by a support means 21.

Referring to FIG. 2 and 2a, it is seen that the support means includes a pair of members 22 and 23 which are arranged in fixed parallel relationship and include an end portion having holes such as hole 24 for insertably receiving a conventional fastener 25, such as a bolt or the like. Additional holes, such as hole 26, are provided at the midsection of each member to receive a similar type of fastener. Preferably, the holes 24 and 26 are critically located on the member so as to coincide with holes which have been prepared in the bumper 12 itself in order to hold a conventional license plate. The license plate is broadly indicated in broken lines by the numeral 27 and it is to be understood that in one construction, the license plate fits within the recess 13 formed in the bumper 12.

The support means taking the form of members 22 and 23 further include a terminating portion 28 and 29 associated with each of the respective members and these latter portions are twisted approximately 90 degrees so that the portions 28 and 29 include opposite surfaces 30 and 31 which are arranged in fixed spaced-apart relationship. The rung 20 is disposed between the opposite surfaces 30 and 31 and are retained by the portions 28 and 29 respectively by means of securement fasteners, such as fastener 32. Therefore, a wide central opening is defined between the underside of bumper 12 and license plate 27 with respect to the rung 20 in order to accommodate the forward portion of the service personnel's foot. The rung is wide enough to support the width of at least one foot. It is to be particularly noted that the support members in FIG. 2 downwardly depend from the underside of the bumper so that the twisted portions ar unencumbered and do not interfere with any operation or driving procedure to which the vehicle may be engaged. The members 22 and 23 are linear from end to end and the flare or twist is arranged in such a way as to be reversed with respect to each of the members Referring now to FIG. 2a, it can be seen that the twist or flare carried on the end portion of member 22 is indicated by numeral 33. The flare or twist carried on the member 23 is opposite from the direction and appearance of the flare 33 and the flare associated with member 23 is indicated by numeral 34.

Referring now to FIG. 3, another embodiment of the invention is shown which includes support members 35 and 36, which are similar to the support members shown in FIG. 2 with the addition that the twisted or flared portions 28 and 29 are curved or bent at locations 37 and 38 outwardly so that the rung 20 projects not only downwardly but forwardly of the license plate or bumper. In side elevation, the curved member 35 as well as member 38 would appear substantially L-shaped.

FIG. 4 is another embodiment of the present invention which is similar to the embodiment shown in FIG. 3 wherein the support means includes members 40 and 41, which not only have a forward extending rung 20 but include an upper rung 42 supported between additional curved or bent portions 43 and 44 carried on the end of the members 40 and 41 opposite to the lower ends carrying rung 20. Therefore, the embodiment of FIG. 4 provides the servicing personnel with a pair of steps so that the servicing personnel may reach or stand higher on the auxiliary step 16.

With reference to FIG. 5, another version is illustrated wherein the support means includes an elongated plate 45 having a flared portion 46 terminating in a lip 47 on which a rung 48 is fixedly secured. The plate 45 includes holes as previously described so as to align with openings in the bumper or frame normally intended to receive license plate fasteners. Therefore, as explained with respect to the embodiments shown in FIGS. 2-4 inclusive, conventional license plate bolts or fasteners can be inserted through the license plate, through the plate 45 and the bumper 12 for retention by a suitable nut or the like.

Referring to FIG. 6, an integral construction is shown wherein the rung 50 and support members 51 and 52 are of a unitary construction. The flared or twist portions are reversed t provide balance to the support means.

In view of the foregoing, it can be seen that the auxiliary step of the present invention provides a novel means for extending the reach of servicing personnel with respect to vans, trucks, recreational vehicles or the like. Furthermore, it can be seen that the flare or twist of the respective support members can be symmetrical, as shown in FIGS. 3 and 4, or, they may be asymmetrical, as shown in FIGS. 2 and 2a.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a vehicle including a vehicle component having an arrangement of holes for receiving a plurality of fasteners associated with retention of a license plate, the combination comprising:

support means having a top portion, a bottom portion and a mid-portion integrally connecting said top and said bottom portions;

said support means top and mid-portions provided with openings alignable with said vehicle component holes for insertably receiving said fasteners to fixedly secure said support means to said vehicle component whereby said bottom portion downwardly depends from said vehicle component;

a foot rung secured to said bottom portion in fixed spaced-apart relationship with respect to said vehicle member.

2. The invention as defined in claim 1 wherein:

said support means comprises a pair of spaced apart members;

each of said members terminating at said bottom portion in a flared twisted end so as to provide opposite and opposing surfaces in spaced parallel relationship; and said foot rung being elongated with opposite ends securely engaged with and between said flared end of each member.

3. The invention as defined in claim 2 wherein:

said rung, said member flared bottom portions and said vehicle component define a central opening to receive the foot of the user.

4. The invention as defined in claim 3 wherein:

said flared member bottom portions and said rung forwardly extend from said member mid-portions to cantilever said rung outwardly from said vehicle component.

5. The invention as defined in claim 4 wherein:

said support means top portion of each member includes a flared twisted end so as to provide opposite and opposing surfaces;

second elongated rung having opposite ends secured to said opposing surfaces; and said flared top portion outwardly bent from said member mid-portion to cantilever said second rung forwardly of said vehicle component in vertical alignment with said first mentioned rung.

6. The invention as defined in claim 3 wherein:

said vehicle component is a vehicle bumper with a central recess;

a license plate retained in said recess by said fasteners in combination with said support means top portions of each member.

7. The invention as defined in claim 2 wherein:

said members and said rung are of unitary construction providing an integral structure.

8. The invention as defined in claim 1 wherein:

said support means is an elongated plate having an integral lower lip curved forwardly of said vehicle component to provide a securement edge;

said rung fixedly attached to said edge so as to be in fixed spaced parallel relationship with respect to said support means plate mid-portion.

* * * * *